No. 699,640. Patented May 13, 1902.
G. AYE.
TROLLEY HEAD OR WHEEL.
(Application filed Sept. 28, 1901.)
(No Model.)
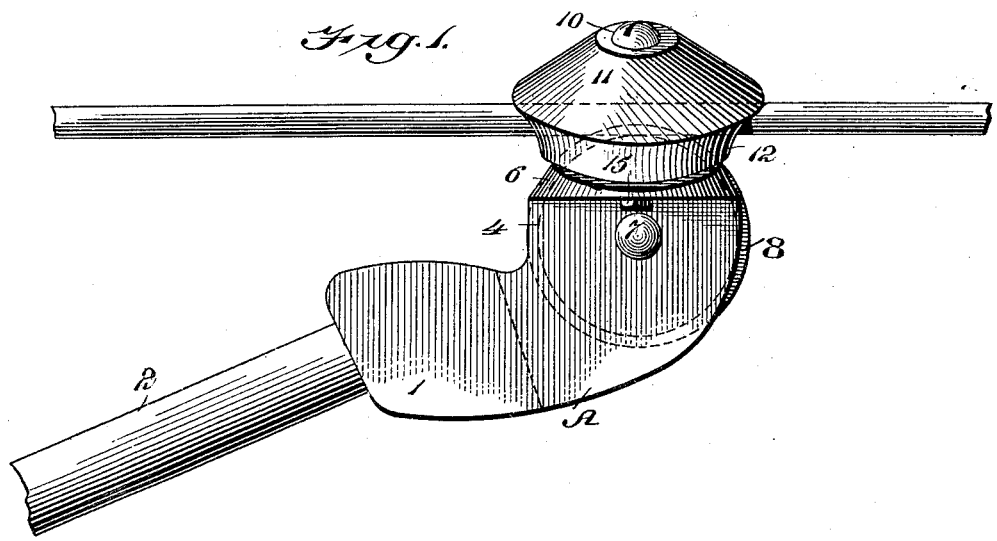
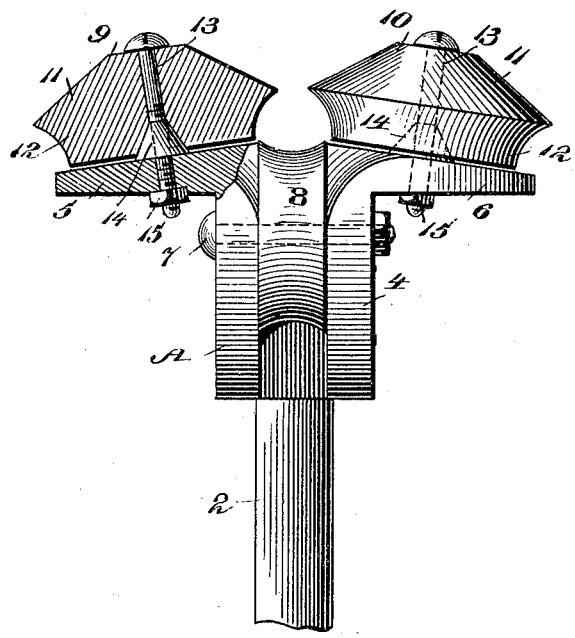
WITNESSES:
INVENTOR
Gottfred Aye
BY Victor J. Evans
Attorney

UNITED STATES PATENT OFFICE.

GOTTFRED AYE, OF KITTANNING, PENNSYLVANIA.

TROLLEY HEAD OR WHEEL.

SPECIFICATION forming part of Letters Patent No. 699,640, dated May 13, 1902.

Application filed September 28, 1901. Serial No. 76,926. (No model.)

*To all whom it may concern:*

Be it known that I, GOTTFRED AYE, a citizen of the United States, residing at and whose post-office address is Kittanning, in the county of Armstrong and State of Pennsylvania, have invented new and useful Improvements in Trolley Heads or Wheels, of which the following is a specification.

My invention relates to improvements in trolley heads or wheels; and the objects are, first, to construct a trolley so that the trolley-wire will not jump from the trolley head or wheel when going around a curve in the track; second, to provide a trolley which will prevent a vibrating wire from escaping from the trolley; third, to provide a trolley which will break and clean the wire of ice, and, fourth, to provide a trolley for the purposes mentioned which is simple and inexpensive in construction, efficient in operation, and durable in use.

With these objects in view my invention consists in the novel construction of parts and their arrangement and aggroupment in operative combination, as will be hereinafter fully described and the novelty thereof particularly pointed out and distinctly claimed.

I have fully and clearly illustrated my improvements in the accompanying drawings, forming a part of this specification, and wherein—

Figure 1 is a side elevation of the device as applied to the overhead conducting-wire. Fig. 2 is a perspective view looking from the rear, one of the retaining-sheaves and laterally-extending arms or seats being shown in central section.

Referring to the drawings, A designates the trolley head or support, formed with an extension 1, having a suitable socket for connecting it to the trolley-pole 2. Integral with shank or extension 1 are formed two plates 3 and 4, parallel with each other and arranged with a wheel-space between them, as seen in the drawings. These plates extend upward and are circular in general contour, substantially coinciding with the perimeter of the main trolley-wheel. At the upper ends of the plates 3 and 4 are formed laterally-extending bearing-seats 5 and 6, on which the auxiliary wheels are mounted. The seats 5 and 6 have downwardly-inclined bearing-surfaces, as shown, and are provided with apertures extending through them at right angles to the inclined surfaces. Through the plates 3 and 4 is secured a pulley-shaft 7, and on this shaft between the plates is loosely journaled the trolley wheel or pulley 8, having a concaved circumferential face. It will be perceived that by making the plates to substantially cover the side faces of the trolley-wheel the wheel is held against lateral vibration in its movements.

On the seats of the lateral 5 and 6 are mounted auxiliary sheaves, wheels, or pulleys 9 and 10, having upper portions 11 to constitute inclines at the inner adjacent approach, so that the trolley-wire will naturally be led into the slot between and through this to ride on the trolley-wheel. The lower portions of the wheels 9 and 10 are curved in cross-section, as at 12, and when mounted on the seats these curved parts overhang the trolley-wheel, as shown in Fig. 2 of the drawings, and serve as bearings, against which the lateral vibration of the wire impinges and as keepers to prevent the wire from accidental escape from the trolley.

13 designates bearing-pins formed or provided with conical annular collars 14. The lower portions of these pins are screw-threaded and project through the lateral extensions of the trolley-head and clamped in position by a nut 15, which draws the base of the conical annular collars down on the inclined faces of the lateral extensions. The pulleys 10 are journaled on the upper portions of the bearing-pins and are bored out to set over the conical collars, as shown in the drawings.

What I claim is—

A trolley-head having alining plates extending from the shank and formed to cover the side faces of a trolley-wheel and having laterally-extending bearing-seats having inclined upper surfaces, a trolley-wheel journaled between the plates, bearing-pins projected through the laterally-extending bearing-seats, and formed with a conical annular collar, and side wheels journaled on the bearing-pins and formed with conical cores to set over the conical collars, and having conical upper portions and curved lower portions, substantially as and for the purpose specified.

In testimony whereof I affix my signature in presence of two witnesses.

FRED. AYE.

Witnesses:
  JOHN P. PAINTER,
  MYRTLE D. THOMPSON.